United States Patent [19]

Austin et al.

[11] Patent Number: 5,159,096

[45] Date of Patent: Oct. 27, 1992

[54] PROCESS FOR THE PREPARATION OF SILOXANE-OXYALKYLENE COPOLYMERS

[75] Inventors: Paul E. Austin, Williamstown; Harold D. Furbee, Friendly, both of W. Va.; Anne K. McMullen, Marietta, Ohio

[73] Assignee: Union Carbide Chemicals & Plastics Technology Corporation, Danbury, Conn.

[21] Appl. No.: 767,825

[22] Filed: Sep. 30, 1991

[51] Int. Cl.$^5$ .................... C07F 7/08; C07F 7/18
[52] U.S. Cl. .................. 556/445; 556/437; 556/444; 556/446
[58] Field of Search ............ 556/437, 444, 445, 446

[56] References Cited

U.S. PATENT DOCUMENTS

| | | | |
|---|---|---|---|
| 2,970,150 | 1/1961 | Bailey | 556/445 X |
| 3,280,160 | 10/1966 | Bailey | 260/448.2 |
| 3,398,174 | 8/1968 | Barnes, Jr. | 260/448.2 |
| 3,401,192 | 9/1968 | Kollomitsch et al. | 260/471 |
| 3,518,288 | 6/1970 | Haluska | 260/448.2 |
| 3,576,027 | 4/1976 | Fish | 556/445 X |
| 3,658,866 | 4/1972 | Tsuji et al. | 556/445 X |
| 4,025,456 | 5/1977 | Litteral et al. | 252/351 |
| 4,122,029 | 10/1978 | Gee et al. | 252/309 |
| 4,431,789 | 2/1984 | Okazaki et al. | 528/15 |
| 4,515,979 | 5/1985 | Otsuki et al. | 556/445 |
| 4,520,160 | 5/1985 | Brown | 524/765 |
| 4,847,398 | 7/1989 | Mehta et al. | 556/437 X |
| 4,978,705 | 12/1990 | Lamont | 524/417 |
| 5,043,464 | 8/1991 | Yamamoto | 556/437 |

Primary Examiner—Paul F. Shaver
Attorney, Agent, or Firm—B. L. Deppenbrock

[57] ABSTRACT

The invention provides an improved solventless hydrosilation process for preparing a siloxane-oxyalkylene copolymers, the improvement comprising conducting the reaction in the presence of at least one sodium metal phosphate.

14 Claims, No Drawings

PROCESS FOR THE PREPARATION OF SILOXANE-OXYALKYLENE COPOLYMERS

BACKGROUND OF THE INVENTION

1. Field of the Invention

This invention relates to an improved process for the preparation of siloxane-oxyalkylene copolymers in an essentially solventless system. More particularly, the invention relates to an improved process for the preparation of siloxaneoxyalkylene copolymers that are suitable for use in personal care, textile, and agricultural applications.

2. Prior Art

The preparation of siloxane-oxyalkylene copolymers by the hydrosilation reaction of an organohydrogensiloxane and a polyoxyalkylene having an olefinically unsaturated end group (hereinafter referred to as "polyoxyalkylene") is well known and described in the literature. The hydrosilation reaction is typically performed in a low molecular weight volatile hydrocarbon solvent. Volatile hydrocarbon solvents such as benzene, toluene, xylene, or isopropanol are employed to aid in handling the reactants, to moderate the exothermic reaction and to promote the solubility of the reactants. Typically, the hydrocarbon solvent is removed by means of an additional processing step after the siloxane-oxyalkylene copolymer is formed.

However, since such solvents may be toxic, result in undesirable hazardous by-products, and require additional Processing step(s), a solventless process for the preparation of siloxane-oxyalkylene has been developed. Thus, for example, U.S. Pat. No. 4,847,398 discloses a process for the preparation of siloxane-oxyalkylene copolymers for use as surfactants in the preparation of urethane foams comprising mixing an organohydrogensiloxane, a polyoxyalkylene, and a carboxylic acid or carboxylic acid salt in the presence of a noble metal hydrosilation catalyst to recover a desired copolymer. In the solventless process disclosed in this patent, sodium propionate is used as a buffer to slow and/or inhibit side reactions such as dehydrocondensation and acetal formation. Unfortunately, the solventless process using sodium propionate also slows or inhibits the hydrosilation reaction and can require the use of more catalyst as compared to the same process utilizing a volatile hydrocarbon solvent such as toluene. As disclosed in this patent, the hydrosilation reaction effected in a solventless process using sodium propionate is slower, and, thus, higher selectivity is realized. As a consequence, the resulting copolymer often possesses lower water solubility and cloud point properties as compared to those copolymers prepared by a process using a volatile hydrocarbon such as toluene.

While lower values for the properties of water solubility and cloud point do not adversely affect product performance in urethane foam applications, such properties in personal care, textile, and agricultural applications can be important to product performance and product acceptance in the marketplace. For personal care, textile, and agricultural applications, there is a need for a solventless Process for the preparation of siloxane-oxyalkylene copolymers having water solubility and cloud point values essentially the same as those obtained from a process utilizing a volatile hydrocarbon solvent. Further, since the color of the resulting copolymer can be related to the level of catalyst used, a reduction in the amount of catalyst required for a solventless hydrosilation process would also be desirable.

SUMMARY OF THE INVENTION

The present invention is directed to an improved process for the preparation of siloxaneoxyalkylene copolymers in an essentially solventless system, by the reaction of an organohydrogensiloxane with a polyoxyalkylene in the presence of a platinum-containing hydrosilation catalyst, wherein the improvement comprises conducting the reaction in the presence of at least one sodium metal phosphate.

Surprisingly, the present invention provides an essentially solventless hydrosilation process that produces a siloxane-oxyalkylene copolymer with essentially the same water solubility and cloud point as that of products prepared in hydrosilation processes using a volatile hydrocarbon solvent such as toluene. The process of the present invention uses less catalyst as compared to the solventless process taught in U.S. Pat. No. 4,847,398. Further, in the process of the present invention, side reactions such as dehydrocondensation and acetal formation are slowed or stopped. Thus, the process of the present invention can be used to produce siloxane-oxyalkylene copolymers for use in personal care products, textile and agricultural applications.

DETAILED DESCRIPTION OF THE INVENTION

The preparation of siloxane-oxyalkylene copolymers by way of a hydrosilation reaction between an organohydrogensiloxane and a polyoxyalkylene is known.

As used throughout the specification and appended claims, the term "solventless" or "essentially solventless" means that no added volatile solvent, i.e., a solvent having a boiling point less than 200° C., is employed in the hydrosilation reaction of the organohydrogensiloxane and the polyoxyalkylene. Any small amount of other liquid which might be introduced into the process with, for example, the catalyst, is incidental and is not considered to be a reaction solvent.

Organohydrogensiloxane

The organohydrogensiloxanes employed in the process of the present invention are represented by and have the average formula:

$$R_aH_bSiO_{\frac{(4-a-b)}{2}} \tag{I}$$

wherein R represents a monovalent hydrocarbon group free of aliphatic unsaturation having 1 to 20 carbon atoms, a has a value ranging from about 1 to 2.99; b has a value ranging from about 0.001 to 1; and the sum of a+b has a value from about 1.5 to 3.0. Illustrative of suitable R groups are alkyl groups having 1 to 20 carbon atoms such as methy, ethyl, propyl, butyl, decyl and cycloaliphatic groups such as cyclohexyl and cyclooctyl; and aryl groups having 6 to 20 carbon atoms such as phenyl, tolyl, and xylyl. Typically R is a methyl group.

The organohydrogensiloxane of Formula I can contain any combination of siloxane units selected from the group consisting of $R_3SiO_{\frac{1}{2}}$, $R_2HSiO_{\frac{1}{2}}$, $R_2SiO_{2/2}$, $RHSiO_{2/2}$, $RSiO_{3/2}$, $HSiO_{3/2}$ and $SiO_{4/2}$. The preparation of organohydrogensiloxanes of formula I is well known and is set forth, for example, in *The Chemistry* and *Technology of Silicones*, Noll, W., Academic Press (New York: 1968) Chapter 5, p. 191-246.

Polyoxyalkylene

The polyoxyalkylene employed in the process of the present invention is represented by and has the average formula:

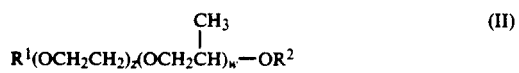

$$R^1(OCH_2CH_2)_z(OCH_2\underset{|}{\overset{CH_3}{CH}})_w\text{—}OR^2 \quad (II)$$

wherein $R^1$ denotes an alkenyl group having from 3 to 10 carbon atoms, preferably three carbon atoms. $R^2$ is selected from the group consisting of hydrogen, an alkyl group having 1 to 5 carbon atoms, preferably 1 to 4 carbon atoms, an acyl group having 2 to 5 carbon atoms, preferably 2 carbon atoms, an aryl group having 6 to 20 carbon atoms, and a trialkylsilyl group. In Formula II, $R^2$ may represent the indicated alkyl, acyl, alkylaryl or trialkylsilyl group but only when present in less than 75 percent of the polyoxyalkylene molecules present in the reaction mixture. In Formula II, z has a value of 0 to 50, Preferably 0 to 10 and w has a value of 0 to 50, preferably 0 to 10 with the proviso that the sum of z+w equal at least 1. The polyoxyalkylene of Formula II is olefinically substituted and may be a blocked or randomly distributed polymer. Generally, the polyoxyalkylene of Formula II is a randomly distributed polymer. The preparation of polyoxyalkylenes (polyethers) is well known in the art. Polyethers useful in the present invention can be obtained from The Dow Chemical Company and BASF Corporation.

Sodium Metal Phosphate

In the process of the present invention at least one sodium metal phosphate is provided to the hydrosilation reaction mixture of the organohydrogensiloxane and polyoxyalkylene. The sodium metal phosphate employed in the process of the present invention has the formula

$$Na_xH_{3-x}PO_4 \quad (III)$$

and is selected from the group consisting of sodium phosphate monobasic, sodium phosphate dibasic and a mixture thereof, and x has a value of 1 or 2. Of these, sodium phosphate dibasic and a mixture of sodium phosphate dibasic and sodium phosphate monobasic are preferred. A mixture of sodium phosphate dibasic and sodium phosphate monobasic is most preferred. The amount of sodium metal phosphate ranges from about 0.01 to about 1 percent by weight, preferably from about 0.06 to about 0.23 percent by weight, based on the total weight of the polyoxyalkylene and the organohydrogensiloxane.

Sodium metal phosphates are also known in the art as sodium acid phosphates or sodium hydrogen phosphates. Sodium metal phosphates are readily available from the Aldrich Chemical Company, Inc. (Milwaukee, WI). Other alkali metal phosphates, such as, for example, potassium metal phosphates, do not work in the present invention because such phosphates can react with the catalyst, especially a platinum-containing catalyst and are generally not as water soluble as sodium metal phosphates.

Noble Metal Catalyst

The hydrosilation process of the present invention is conducted in the presence of a noble metal hydrosilation catalyst. Such catalysts are well known and include platinum, palladium, and rhodium containing catalysts. Chloroplatinic acid is particularly preferred. The catalyst is employed in a catalytic amount sufficient to promote the hydrosilation reaction between the organohydrogensiloxane and the polyoxyalkylene. In practice, the amount of catalyst will usually be present in an amount ranging from about 1 to about 100 ppm by weight of noble metal based on the total charge of the reactants. Preferably the amount of catalyst ranges from about 1 to about 15 ppm by weight of noble metal based on the total charge of the reactants.

Reaction Conditions

In the process of the present invention, the hydrosilation reaction is conducted in a batch process or in a semi-batch (staged) process. In a batch process the reactants are introduced into a reactor and the temperature of the mixture is adjusted to within the range of from about 0° C. to about 165° C., and more preferably from about 70° C. to about 100° C. Upon addition of the catalyst, the reaction is usually exothermic, peaking at a temperature of from about 75° C. to about 145° C. depending upon the temperature of the initial mixture. Thereafter the desired polymer is recovered.

In a semi-batch Process, all components of the reaction mixture, with the exception of the organohydrogensiloxane, are introduced to the reactor. In the semi-batch Process, about 20 to 25 percent of the organohydrogensiloxane is introduced into the reactor and the temperature of the resulting mixture is adjusted to a temperature ranging from about 0° C. to about 165° C., Preferably about 70° C. to about 100° C. Upon the addition of the catalyst, the reaction is exothermic, peaking at a temperature of from about 75° C. to about 145° C. depending upon the temperature of the initial mixture. At the peak of the exotherm, the remainder of the organohydrogensiloxane is added at such a rate to maintain the desired temperature. Thereafter the desired Polymer is recovered. If desired, the process of the invention can be carried out as either a batch or semi-batch process, and is usually conducted in an inert atmosphere such as nitrogen.

The siloxane-oxyalkylene copolymers produced by the process of the present invention may be readily incorporated into Personal care and textile formulations and agricultural applications by techniques known in the art. Such techniques for personal care formulations can include, for example, those taught in European Patent Application 87/3,089,726 and Japanese Patent 02/273,618 [90/273,618], but are not necessarily limited to the techniques of these references. Exemplary agricultural applications are described in "Polymer Improving the Biological Efficacy of Small Droplets of Permethrin by the Addition of Silicon Based Surfactants", Adams, A.J., Fenton, J.S.; *Ann. Appl. Biol.*, 1988, Volume 112, p. 19.

Whereas the scope of the present invention is set forth in the appended claims, the following specific examples illustrate certain aspects of the present invention and, more particularly, point out methods of evaluating the same. It is to be understood, therefore, that the examples are set forth for illustration only and are not to be construed as limitations on the present invention. All parts and percentages are by weight unless otherwise specified.

Test Procedure

The following test procedures were used to evaluate the products obtained in the examples.

CLOUD POINT

Cloud point is a measurement of water solubility and as used herein is the temperature at which a siloxane-oxyalkylene copolymer, for example, begins to precipitate out of a 1% copolymer/99% water solution. The higher the cloud point the greater the water solubility.

Cloud Point was determined as follows: A 1-gram of sample was dissolved in 99 ml of distilled water in a 150 ml beaker. A 1 inch plastic coated stirrer bar was inserted in the beaker, and the beaker was placed on a combination stirrer/hot plate. A 0 to 100° C. thermometer was suspended in the solution with the bulb ½ inch from the bottom of the beaker. With mild stirring, the contents of the beaker were heated at the rate of 1 to 2° C. per minute. The temperature at which the submerged portion of the thermometer was no longer visible was recorded.

COLOR (GVS)

The color of the sample was compared to varnish color disk 620C-40 in a Hollige Daylight Comparator. The closest matched color was recorded as the color, GVS.

COLOR (Pt/Co or ALPHA)

The color of the sample was compared to distilled water in a Hellige Aqua Tester using an Aqua Color Disc. The closest match was recorded as the color, Platinum-cobalt.

As known by one skilled in the art, the Pt/Co (or ALPHA) scale is a more sensitive color measurement than the GVS scale. For example, 1 GVS corresponds roughly to 150 Pt/CO, and pure clear water has a color of about 5 Pt/Co.

VISCOSITY

Viscosity was determined at 25° C. using a calibrated Ostwald viscometer which gives an efflux time of approximately 100 seconds. The measurements are repeated until the efflux time readings agree within 0.1 seconds. Calculations are determined by the equation: $E \times F = $ Viscosity (cst), where $E = $ Efflux time in seconds; $F = $ Calibration factor.

HACH NUMBER

HACH number is a measurement of water solubility and is used herein as a measurement of the clarity of 5% of a siloxane-oxyalkylene copolymer in a 95% water solution. For purposes of solubility, the lower the HACH number, the greater the water solubility of the copolymer.

The clarity or haze is determined using a HACH Turbidimeter model 2100A or equivalent instrument. The Nephelometric Turbiduty Units (NTU's) are reported as the HACH number.

EXAMPLES p The compositions used in the Examples are set forth in Tables 1 and 2. Results of the Examples are set forth in Tables 3–6.

EXAMPLE A

With Toluene: Batch Process

To a 4-neck, round bottom flask, equipped with a stirrer, Friedrich condenser, a temperature controller and a sparge tube, 145.3 grams of allyloxypolyethylene glycol (APEG: 500 mw), 86 grams toluene and 54.7 grams of equilibrated organohydrogensiloxane having the nominal empirical formula, $MD_{13}D'_6M$, where $M=(CH_3)_3SiO_{\frac{1}{2}}$, $D=(CH_3)_2SiO$ and $D'=CH_3(H)SiO$ were charged. The flask contents were agitated and heated to 94° C. with a light nitrogen sparge. At 94° C., heating and sparging were discontinued, and the reaction was catalyzed with 0.1 cc of 3.3% chloroplatinic acid solution in ethanol. Within 5 minutes, the reaction exothermed and the flask temperature peaked at 106° C. Since the reaction did not go to completion, it was recatalyzed with 0.5 cc of 3.3% chloroplatinic acid solution in ethanol, bringing the total catalyst charge to 0.15 cc chloroplatinic acid solution in ethanol. Following the completion of the reaction, the mixture was subjected to an acetal treatment involving the addition of 1.5% water and 0.25% concentrated HCl at a temperature of 60° C. for one hour. Following neutralization with dry $NaHCO_3$, toluene and water were stripped from the product. The product was filtered.

EXAMPLE B

With Toluene: Staged Process

In equipment identical to that of Example A, 288.0 grams of allyloxypolyethylene glycol (APEG: 500 mw), 172 grams toluene and 28.1 grams (25% of the total organohydrogenpolysiloxane) of equilibrated organohydrogensiloxane as employed in Example A were charged to the flask. The flask contents were agitated and heated to 92° C. with a light nitrogen sparge. At 92° C., heating and sparging were discontinued, and the reaction was catalyzed with 0.2 cc of 3.3% chloroplatinic acid solution in ethanol. After an initial exotherm to 97° C., 84.1 grams of the organohydrogenpolysiloxane were added gradually to the mixture in the flask. Following the completion of the reaction, 2.0% water and 0.16% acetic acid were added and held at 80° C. for one hour for the acetal treatment. Following neutralization with dry $NaHCO_3$, toluene and water were stripped from the product. The product was filtered.

TABLE 1

| | | | | | | | | | | | |
|---|---|---|---|---|---|---|---|---|---|---|---|
| Example No. | Toluene | APEG | $MD_{13}D'_6M$ | Buffer #1 Amount | Buffer #2 Amount | 3.3% CPA In ethanol | PPM Pt | Reaction Temp °C. | Recat | Acetal Treatment | Process |
| A* | 86 g | 145.3 g | 54.7 g | — | — | 0.15 ml | 7.5 | 94–106 | yes | yes | batch |
| B* | 172 g | 288.0 g | 112.2 g | — | — | 0.20 ml | 5 | 92–97 | no | yes | staged |
| C* | 108 g | 183.8 g | 66.4 g | — | — | 0.13 ml | 5 | 74–96 | no | yes | batch |
| D* | 150 g | 220.6 g | 79.6 g | — | — | 0.15 ml | 5 | 80–106 | no | yes | batch |
| E | — | 144.5 g | 55.5 g | sodium propionate 0.07 g | — | 0.30 ml | 15 | 88–108 | yes | no | batch |
| F | — | 144.5 g | 55.5 g | sodium propionate | — | 0.30 ml | 15 | 83–89 | yes | no | batch |

TABLE 1-continued
Compositions Using $MD_{13}D'_6M$ with APEG (500 mw)

| Example No. | Toluene | APEG | $MD_{13}D'_6M$ | Buffer #1 Amount | Buffer #2 Amount | 3.3% CPA In ethanol | PPM Pt | Reaction Temp °C. | Recat | Acetal Treatment | Process |
|---|---|---|---|---|---|---|---|---|---|---|---|
| G | — | 144.5 g | 55.5 g | soidum propionate 0.07 g | — | 0.30 ml | 15 | 93–113 | no | no | batch |
| H | — | 144.5 g | 55.5 g | sodium propionate 0.07 g | — | 0.15 ml | 7.5 | 97–113 | yes | no | batch |
| I | 43 g | 74.2 g | 25.9 g | sodium propionate 0.07 g | — | 0.10 ml | 10 | 79–105 | no | no | batch |
| J | — | 432.0 g | 163.3 g | sodium propionate 0.04 g | — | 0.225 ml | 3.75 | 92–111 | no | no | staged |
| K | — | 1102.5 g | 397.5 g | sodium propionate 0.30 g | — | 0.75 ml | 5 | 85–100 | no | no | staged |
| L | — | 72.7 g | 27.4 g | sodium acetate 0.22 g | — | 0.075 ml | 7.5 | 79–83 | yes | no | batch |
| M | 172 g | 294.0 g | 106.3 g | sodium propionate 0.04 g | — | 0.15 ml | 3.75 | 90 | yes | no | batch |
| 1 | — | 73.5 g | 26.5 g | $NaH_2PO_4$ 0.15 g | — | 0.13 ml | 13 | 85–96 | no | no | batch |
| 2 | — | 73.5 g | 26.5 g | $NaH_2PO_4$ 0.11 g | — | 0.13 ml | 13 | 85–100 | no | no | batch |
| 3 | — | 73.5 g | 26.5 g | $NaH_2PO_4$ 0.11 g | — | 0.05 ml | 5 | 85–88 | no | no | batch |
| 4 | — | 222.5 g | 77.9 g | $NaH_2PO_4$ 0.11 g | — | 0.33 ml | 11 | 85–100 | no | no | batch |
| 5 | — | 222.5 g | 77.9 g | $NaH_2PO_4$ 0.11 g | — | 0.33 ml | 11 | 85–100 | no | yes | batch |
| 6 | — | 73.5 g | 26.5 g | $Na_2HPO_4$ 0.15 g | — | 0.13 ml | 13 | 85–92 | no | no | batch |
| 7● | — | 91.9 g | 33.2 g | $NaH_2PO_4$ 0.07 g | $Na_2HPO_4$ 0.08 g | 0.06 ml | 5 | 83–95 | no | no | batch |
| 8 | — | 284.1 g | 108 g | $NaH_2PO_4$ 0.21 g | $Na_2HPO_4$ 0.26 g | 0.20 ml | 5 | 85–98 | no | no | batch |
| 9 | — | 284.1 g | 108 g | $NaH_2PO_4$ 0.21 g | $Na_2HPO_4$ 0.26 g | 0.20 ml | 5 | 85–98 | no | no | batch |
| 10 | — | 341 lb | 128 lb | $NaH_2PO_4$ 113 g | $NaH_2PO_4$ 131 g | 35 ml of 10% CPA | 5 | 90–105 | no | yes | batch |
| 11 | 30 g | 73.5 g | 26.5 g | $NaH_2PO_4$ 0.11 g | — | 0.13 ml | 13 | 85–100 | no | no | batch |

*Control
"recat" is short for recatalyzed. i.e., the reaction did not go to completion with the amount of catalyst initially added a thus required more catalyst to go to completion.
●After the hydrosilation, held at 130° C. for 1 hour folowed by 2 hours at 150° C.

TABLE 2
Compositions Using $MD_{13}D''_6M$ with APEG (389 mw) in a Batch Process

| Example No. | Toluene | APEG | $MD_{13}D'_6M$ | Buffer #1 Amount | Buffer #2 Amount | 3.3% CPA In ethanol | PPM Pt | Reaction Temp °C. | Recat | Acetal Treatment |
|---|---|---|---|---|---|---|---|---|---|---|
| N* | 86 g | 131 g | 68.6 g | — | — | 0.10 ml | 5 | 75–97 | no | yes |
| O* | 86 g | 131.6 g | 68.6 g | — | — | 0.18 ml | 9 | 80–117 | no | yes |
| P | — | 131.4 g | 68.6 g | TMHP 0.13 g** | — | 0.15 ml | 7.5 | 79–93 | yes | no |
| Q | — | 526.2 g | 274.4 g | sodium acetate 0.50 g | — | 0.74 ml | 9 | 70–134 | no | no |
| R | — | 526.2 g | 274.4 g | sodium acetate 0.50 g | — | 0.74 ml | 9 | 70–134 | no | yes |
| S | — | 535.6 g | 274.4 | sodium propionate 0.26 g | — | 0.40 ml | 5 | 85–118 | no | no |
| T | — | 131.4 g | 68.6 g | sodium stearate 0.13 g | — | 0.13 ml | 6.5 | 80–108 | no | no |
| U | — | 131.4 g | 68.6 g | sodium succinate 0.13 g | — | 0.13 ml | 6.5 | 80–120 | no | no |
| V | — | 131.4 g | 68.6 g | sodium phospinate 0.13 g | — | 0.13 ml | 6.5 | 80–132 | no | no |
| W | — | 131.4 g | 68.6 g | triethylamine 0.13 g | — | 0.13 ml | 6.5 | 80–129 | no | no |
| X | — | 131.4 g | 68.6 g | sodium acetate 0.13 g | — | 0.225 ml | 10 | 80–105 | yes | no |
| Y | — | 131.4 g | 68.6 g | sodium propionate 0.13 g | citric acid 0.13 g | 0.13 ml | 6.5 | 80–121 | no | no |
| Z | — | 131.4 g | 68.6 g | sodium acetate 0.13 g | citric acid 0.13 g | 0.13 ml | 6.5 | 80–113 | no | no |
| 12 | — | 262.8 | 137.2 | $NaH_2PO_4$ 0.16 g | $Na_2HPO_4$ 0.19 g | 0.30 ml | 7.5 | 85 | yes | no |
| 13 | — | 262.8 | 137.2 | $NaH_2PO_4$ 0.16 g | $Na_2HPO_4$ 0.19 g | 0.30 ml | 7.5 | 85 | yes | yes |

*Control
"recat " is short for recatalyzed, i.e., the reaction did not go to completion with the amount of catalyst initially added thus required more catalyst to go to completion.
**TMHP = 2,2,6,6-tetramethyl-4-piperidinol

TABLE 3
$MD_{15}D'_6M$ + APEG (500 mw): Solventless with Sodium Phosphates

| Example No.[1] | Process | Toluene | Buffer | Acetal Treatment | Color | Cloud Viscosity | Point |
|---|---|---|---|---|---|---|---|
| A | Batch | 30% | NONE | YES | 2 GVS | 405 | 93° C. |
| B | Staged | 30% | NONE | YES | 1 GVS | 932 | 87° C. |
| C | Batch | 30% | NONE | YES | 100 Pt/Co | 617 | 87° C. |
| D | Batch | 30% | NONE | YES | 100 Pt/Co | 511 | 90° C. |
| 1 | Batch | 0% | $NaH_2PO_4$ | NO | 1 GVS | 481 | 99° C. |

TABLE 3-continued

| | | | $MD_{15}D'_6M$ + APEG (500 mw): Solventless with Sodium Phosphates | | | | |
|---|---|---|---|---|---|---|---|
| Example No.[1] | Process | Toluene | Buffer | Acetal Treatment | Color | Viscosity | Cloud Point |
| 2 | Batch | 0% | $NaH_2PO_4$ | NO | 70 Pt/Co | 533 | 87° C. |
| 3 | Batch | 0% | $NaH_2PO_4$ | NO | 1–2 GVS | 502 | 99° C. |
| 4 | Batch | 0% | $NaH_2PO_4$ | NO | 20 Pt/Co | 640 | 94° C. |
| 5 | Batch | 0% | $NaH_2PO_4$ | YES | 60 Pt/Co | 525 | 93° C. |
| 6 | Batch | 0% | $Na_2HPO_4$ | NO | 50–60 Pt/Co | 470 | 90° C. |
| 7 | Batch | 0% | $NaH_2PO_4/Na_2HPO_4$ | NO | 1 GVS | 854 | 85° C. |
| 8 | Staged | 0% | $NaH_2PO_4/Na_2HPO_4$ | NO | 60 Pt/Co | 500 | 90° C. |
| 9 | Staged | 0% | $NaH_2PO_4/Na_2HPO_4$ | YES | 80 Pt/Co | 579 | 86° C. |
| 10 | Staged | 0% | $NaH_2PO_4/Na_2HPO_4$ | YES | 60 Pt/Co | 857 | 87° C. |

[1]These reactions did not require recatalyzation.

In Table 3, Examples A–D are controls which demonstrate the processes (batch and semi-batch or staged) as they are presently practiced using toluene as the solvent. Examples 1–10 demonstrate the process of the present invention in which a sodium metal phosphate (Examples 1–6) and a mixture of sodium metal phosphates (Examples 7–10) are employed. Examples 1–5 employ sodium phosphate monobasic (pH=4.1); Example 6 employs sodium phosphate dibasic (pH=8.7); and Examples 7–10 employ a 50/50 molar ratio mixture (PH=6.4) of sodium phosphate monobasic and sodium phosphate dibasic. As is evident from the results of Examples 1–10 in Table 3, the copolymers of the essentially solventless process of the present invention produced a cloud point comparable to the cloud points of those processes which employed toluene as a solvent.

Example 5 is the acetal treated product of Example 4 and, likewise, Example 9 is the acetal treated product of Example 8. From Examples 5 and 9 it can be seen that the acetal treatment had little or no effect on the cloud point of the copolymer. That is, the cloud points of Examples 5 and 9 were high and within range observed for the controls which employed toluene solvent.

Example 10, is a 470-pound pilot plant scale-up illustrating that the hydrosilation proceded rapidly, did not require recatalyzation and produced a copolymer having the desired cloud point.

In Table 4, Examples A–D are controls which demonstrate the process as they are presently practiced using toluene as the solvent. Examples E–J illustrate the use of sodium propionate in accordance with the disclosure in U.S. Pat. No. 4,847,398. From the results of Examples E–J, it can be seen that the cloud points of the copolymers are lower (ranging from 71–83° C.) than those obtained from the copolymers produced by those processes which employed toluene as the solvent.

Further, in Table 4, Example K illustrates the use of sodium acetate as the buffer in accordance with the disclosure in U.S. Pat. No. 3,398,174. The reaction using sodium acetate was slowed and required additional catalyst (i.e., recatalyzation) in order to go to completion. And, furthermore, the copolymer of Example K had a much higher viscosity and a lower cloud point as compared to the controls (Examples A–D).

TABLE 5

| | | $MD_{13}D'_6M$ + APEG (500 mw), Toluene and Buffer | | | | | |
|---|---|---|---|---|---|---|---|
| Example No. | Process | Toluene | Buffer | Recatalyzed | Acetal Treatment | Color | Viscosity | Cloud Point |
| A | Batch | 30% | NONE | No | YES | 2 GVS | 405 | 93° C. |
| C | Batch | 30% | NONE | No | YES | 100 Pt/Co | 617 | 87° C. |
| D | Batch | 30% | NONE | No | YES | 100 Pt/Co | 511 | 90° C. |
| L | Batch | 30% | sodium propionate | No | NO | 2 GVS | 648 | 78° C. |
| M | Batch | 30% | sodium propionate | Yes | NO | 50 Pt/Co | 347 | 71° C. |
| 11 | Batch | 30% | $NaH_2PO_2/Na_2HPO_4$ | No | NO | 70 Pt/Co | 533 | 87° C. |

In Table 5, Examples A, C, and D are controls prepared by the batch process using toluene as the solvent. Comparative Examples L and M were prepared such that they contained both toluene as the solvent and sodium propionate as the buffer. Example L shows that the addition of sodium propionate resulted in a lower cloud point. In Example M, the hydrosilation reaction was slow, requiring recatalyzation, and the cloud point was 71° C., a lower cloud point as compared to the controls. Example 11 was prepared such that it con-

TABLE 4

| | | $MD_{13}D'_6M$ + APEG (500 mw); Solventless with other buffers | | | | | |
|---|---|---|---|---|---|---|---|
| Example No. | Process | Toluene | Buffer | Recatalyzed | Acetal Treatment | Color | Viscosity | Cloud Point |
| A | Batch | 30% | NONE | No | YES | 2 GVS | 405 | 93° C. |
| B | Staged | 30% | NONE | No | YES | 1 GVS | 932 | 87° C. |
| C | Batch | 30% | NONE | No | YES | 100 Pt/Co | 617 | 87° C. |
| D | Batch | 30% | NONE | No | YES | 100 Pt/Co | 511 | 90° C. |
| E | Batch | 0% | sodium propionate | Yes | NO | 2 GVS | 519 | 80° C. |
| F | Batch | 0% | sodium propionate | Yes | NO | 4 GVS | 515 | 83° C. |
| G | Batch | 0% | sodium propionate | No | NO | 3 GVS | 668 | 75° C. |
| H | Batch | 0% | sodium propionate | Yes | NO | 1–2 GVS | 452 | 74° C. |
| I | Staged | 0% | sodium propionate | Yes | NO | 70 Pt/Co | 473 | 72° C. |
| J | Staged | 0% | sodium propionate | No | NO | 2 GVS | 428 | 81° C. |
| K | Batch | 0% | sodium acetate | Yes | NO | — | 1697 | 69.8° C. | tained both toluene as the solvent and a sodium phosphate monobasic/sodium phosphate dibasic mixture. In Example 11, the hydrosilation reaction was rapid, not requiring recatalyzation, and the cloud point (87° C.) was within the range of the copolymers of the control examples (A, C, and D).

$$Na_xH_{3-x}PO_4$$

wherein x has a value of 1 or 2.

3. The process of claim 2 wherein the sodium metal phosphate is selected from the group consisting of sodium phosphate monobasic, sodium phosphate dibasic,

TABLE 6

MD$_{13}$D'$_6$M + APEG (389 mw); Solventless with Various Buffers in Batch Process

| Example No. | Toluene | Buffer | Recatalyzed | Acetal Treatment | Color | Viscosity | Cloud Point | HACH(ntu) 5% H$_2$O Solution |
|---|---|---|---|---|---|---|---|---|
| N | 30% | None | No | Yes | 60 Pt/Co | 486 | 48° C. | clear |
| O | 30% | None | No | Yes | | 396 | 52° C. | clear (35) |
| 12 | 0% | NaH$_2$PO$_4$/Na$_2$HPO$_4$ | No | No | | 381 | 54° C. | clear (15.3) |
| 13 | 0% | NaH$_2$PO$_4$/Na$_2$HPO$_4$ | No | Yes | | 511 | 48° C. | clear |
| P | 0% | TMHP* | Yes | No | | 527 | 47° C. | cloudy |
| Q | 0% | sodium propionate | No | No | | 290 | — | cloudy (60) |
| R | 0% | sodium propionate | No | Yes | | 478 | — | cloudy (70) |
| S | 0% | sodium propionate | No | No | 1 GVS | 358 | 44¼° C. | cloudy |
| T | 0% | Sodium stearate | No | No | | 300 | 52° C. | cloudy (72) |
| U | 0% | Sodium succinate | No | No | | 316 | 51° C. | cloudy (66) |
| V | 0% | sodium phosphinate | No | No | | 283 | 61° C. | hazy (50) |
| W | 0% | triethylamine | No | No | | 322 | 52° C. | cloudy (190) |
| X | 0% | sodium acetate | Yes | No | | 302 | 52° C. | cloudy (90) |
| Y | 0% | sodium propionate/ citric acid) | No | No | | 334 | — | cloudy (240) |
| Z | 0% | sodium acetate/ citric acid | No | No | | 327 | — | cloudy (240) |

*TMHP = 2,2,6,6-tetramethyl-4-piperidinol

Water solubility and/or the property of a siloxane-oxyalkylene copolymer to form a clear solution is important in cosmetic and/or personal care applications as well as in some textile and agricultural applications. For example, the copolymer often serves as an emulsifier for oils (e.g., mineral oils, dyes, etc.) in water. Or, the copolymer may serve as a foaming agent. If the copolymer of an emulsion were to Precipitate, such precipitation would result in the oils or dyes, for example, coming out of solution. Thus, there would no longer be a continuous homogeneous phase. Also, once the copolymer precipitated out of solution, it could additionally act as a defoamer.

In Table 6, all the Examples use allyloxypolyethylene glycol (APEG: 389 mw). As can be seen from the examples, copolymers prepared using APEG (389 mw) have a lower cloud point than copolymers prepared using APEG (500 mw). Examples N and 0 are controls using toluene as the solvent. As can be seen, the copolymers of Examples N and 0 have a low HACH number (35) and form a clear solution in a 5% H$_2$O solution. Likewise, it can be seen that the copolymers of Examples 12 and 13 of the present invention, which copolymers use a mixture or blend of NaH$_2$PO$_4$/Na$_2$HPO$_4$ also produce a clear solution having a low HACH number (15.3). In contrast, the copolymers prepared in Examples P-Z in a solventless process using other buffers result in cloudy or hazy 5% water solutions, and hence are less water soluble than the copolymers produced by the process of the present invention.

What is claimed is:

1. In a process for preparing siloxane-oxyalkylene copolymers in an essentially solventless system by the reaction of an organohydrogensiloxane with polyoxyalkylene in the presence of a noble metal hydrosilation catalyst, the improvement comprising conducting the reaction in the presence of at least one sodium metal phosphate.

2. The process of claim 1 wherein the sodium metal phosphate has the formula:

and a mixture thereof.

4. The process according to claim 3 wherein the sodium metal phosphate is sodium phosphate dibasic.

5. The process of claim 3 wherein the sodium metal phosphate is a mixture of sodium phosphate monobasic and sodium phosphate dibasic.

6. The process of claim 2 wherein the amount of the sodium metal phosphate ranges from about 0.01 to about 1 percent based on the total weight of the polyoxyalkylene and organohydrogensiloxane.

7. The process of claim 1 wherein the noble metal hydrosilation catalyst contains platinum.

8. The process according to claim 7, wherein the catalyst is chloroplatinic acid.

9. The process of claim 1 wherein the catalyst is present in an amount ranging from about 1 to 100 ppm Pt by weight based on the amount of the total weight of the polyoxyalkylene and the organohydrogensiloxane.

10. The process of claim 1 wherein the organohydrogensiloxane has the average formula: R$_a$H$_b$SiO$_{(4-a-b)/2}$ wherein R represents a monovalent hydrocarbon group free of aliphatic unsaturation having 1 to 20 carbon atoms; a has a value ranging from about 1 to 2.99; b has a value ranging from about 0.001 to 1; and the sum of a+b has a value from about 1.5 to 3.0.

11. The process of claim 1 wherein the organohydrogensiloxane comprises, in addition to siloxy units having silicon-bonded-hydrogen, siloxy units selected from the group consisting of: R$_3$SiO$_{\frac{1}{2}}$, R$_2$SiO$_{2/2}$, RSiO$_{3/2}$, and SiO$_{4/2}$ and any combination thereof, wherein R is a monovalent hydrocarbon free of aliphatic unsaturation group having 1 to 20 carbon atoms.

12. The process according to claim 1 wherein the polyoxyalkylene has the average formula:

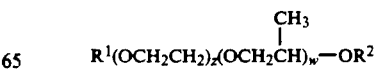

wherein the ethylene oxide and propylene oxide may be blocked or random and wherein R$^1$ is an alkenyl group having 3 to 10 carbon atoms, $R^2$ is selected from the group consisting of hydrogen, an alkyl group having 1 to 5 carbon atoms, an acyl group having 2 to 5 carbon atoms, an aryl group having 6 to 20 carbon atoms, and a trialkylsilyl group; z has a value ranging from 0 to 50; and w has a value ranging from 0 to 50 with the proviso that the sum of z+w equal at least 1.

13. The process of claim 1 wherein the organohydrogensiloxane has the average formula: $(CH_3)_3Si-O[(CH_3)_2SiO]_{0-200}(CH_3HSiO)_{1-25}Si(CH_3)_3$ and the polyoxyalkylene has the average formula: $CH_2=CHCH_2O(CH_2CH_2O)_z(CH_2CHCH_3O)_wH$ wherein z has a value ranging from 0 to 50, w has a value ranging from 0 to 50 with the proviso that the sum of z+w equal at least 1.

14. The process of claim 1 wherein the reaction is effected at a temperature from about 0° C. to about 165° C.

* * * * *